Patented June 8, 1954

2,680,745

UNITED STATES PATENT OFFICE 2,680,745

S-BENZYLTHIOURONIUM DINITROPHENATES

W E Craig and Chien-Pen Lo, Philadelphia, Pa., assignors to Rohm & Haas Company, Philadelphia, Pa., a corporation of Delaware No Drawing. Application February 13, 1953, Serial No. 336,881

6 Claims. (Cl. 260—309.6)

This invention concerns S-benzylthiouronium dinitrophenates of the structure

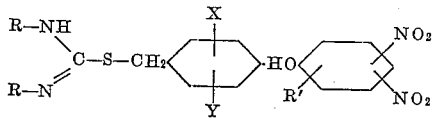

wherein each R is hydrogen, or an alkyl group, or the two R's together form an ethylene chain, X and Y represent hydrogen or chlorine, and R' represents an alkyl group of not over eight carbon atoms, a cyclohexyl group, or chlorine. These compounds are effective fungicidal and/or insecticidal agents, fish poisons, and/or molluscacides.

While picric acid salts of a number of thiouronium compounds have been made for purposes of isolation and/or identification, these salts are lacking in the properties which render useful the compound of this invention. Furthermore, the picric acid salts are two phytocidal to permit their application to green plants.

The compounds of this invention are prepared by mixing a thiouronium halide and an alkali metal salt of a dinitrophenol in an inert organic solvent, effecting reaction, and separating alkali metal halide and thiouronium dinitrophenate, thus

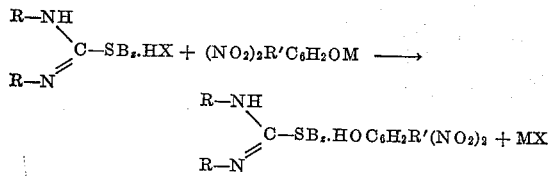

where Bz represents a benzyl nucleus.

The reaction is effected between 25° and 125° C. in a solvent such as ethylene dichloride, toluene, benzene, ethanol, isopropanol, aqueous methanol, or acetone, etc. The product and salt are separated, as by filtering, washing with water, or precipitating with water from water miscible solvents.

Typical preparations are described in the following illustrative examples in which parts are by weight.

Example 1

A solution is prepared from 20 parts of 4,6-dinitro-o-cresol, 4 parts of sodium hydroxide, 100 parts of methanol, and 100 parts of water. To this is added a solution of 20.3 parts of S-benzylthiouronium chloride in 60 parts of ethanol. The mixture is stirred for an hour and diluted with water. A solid separates. It is filtered off and recrystallized from water. It then melts at 120°–122° C. and contains 8.6% of sulfur and 15.4% of nitrogen (theory 8.8% and 15.4%, respectively), thus corresponding in composition to S-benzylthiouronium 4,6-dinitro-o-cresolate.

This compound in standard toxicity tests gives a kill of aphids of 94%, using a spray with a 1:1600 dilution of the compound. At 1:1200 it gives a 90% kill of mealy bugs and a 100% kill of red spiders. Against bean beetle larvae it gives a kill of 89% when applied at a 0.5% dilution. It is not toxic to tomato or bean plants at useful dilutions.

This is in surprising contrast to the S-benzylthiouronium picric acid salt, which gives no control of flies, aphids, or milkweed bugs and is very phytotoxic to tomato and bean plants.

Example 2

A mixture of 188 parts of N,N'-di-n-butylthiourea, 138 parts of benzyl chloride, and 500 parts of ethanol is heated under reflux for four hours. The mixture is concentrated under reduced pressure, and the dibutyl-S-benzylthiouronium chloride is collected as an orange oil.

A portion of 23 parts of this oil is dissolved in methanol and thereto is added a solution of sodium 2-capryl-4,6-dinitrophenate in methanol. Water is added and an oil separates. This is taken up in benzene, washed with water, and dried. The benzene is evaporated to leave a dark red oil, which corresponds in composition to N,N'-dibutyl-S-benzylthiouronium 2-capryl-4,6-dinitrophenate.

At a dilution of 1:400 in a spray this compound gives a 100% kill of red spiders; at 1:800, a 99% kill; and at 1:1600, a 99% kill. A wettable powder at one pound per 100 gallons gave a 98% kill of red spider, while at eight pounds per 100 gallons the compound in a wettable powder gave a 73% kill against army worm.

The salt of N,N'-dibutyl-S-benzylthiourea and picric acid is highly phytotoxic to green plants.

Example 3

In the same way there are reacted 237 parts of S-2-chlorobenzylthiouronium chloride and 296 parts of a solution of 198 parts of 2,4-dinitro-o-cresol solubilized with about an equivalent of caustic soda solution. The product formed is S-(2-chlorobenzyl)thiouronium 4,6-dinitro-o-cresolate.

This compound tested against aphids in a spray gives a kill of 72% at a dilution of 1:1600. At a dilution of 1:1200 it gives a kill of 100% against red spider. Against bean beetle larvae it gives a kill of 92% when used at ½%, of 90% when used at 0.25%, and of 73% when used at 0.125%. It is not phytotoxic to tomatoes or beans.

The comparable picric acid salt is ineffective and highly phytotoxic.

*Example 4*

In the same way there are reacted equivalent weights of S-benzylthiouronium chloride and sodium 2-capryl-4,6-dinitrophenate to form S-benzylthiouronium 2-capryl-4,6-dinitrophenate. In the Peet-Grady test this compound at 5% gives a knock-down of 97% and a kill of +22 compared to the Official Test Insecticide. At a dilution of 1:1600 in a spray this compound gives a kill of aphids of 97%. At a dilution of 1:1200 in a spray this compound gives a kill of 100% of red spider. In tests against bean beetle larvae this compound at 1% gives a kill of 100%, at 0.5% of 93%, at 0.25% of 89%, and at 0.125% of 83%. It is not phytotoxic to beans or tomatoes.

*Example 5*

In the same way equivalent weights of S-(3,4-dichlorobenzyl)thiouronium chloride and sodium 2 - capryl - 4,6 - dinitrophenate are reacted in ethanol and water to form S-(3,4-dichlorobenzyl)thiouronium 2-capryl-4,6-dinitrophenate. This compound was made into a 5% dust, which was applied against aphids with a kill of 98%. A 2% dust gave a kill of 92%, while a 1% dust gave a kill of 79% against aphids. These dusts were also applied to red spiders, kills of 100% being obtained at 5% and 2% and of 99% at 1%. In a spray at 1:400 this compound gave a kill of 98% against red spider and 93% against aphids.

*Example 6*

In the same way N,N-dibutylthiourea is reacted with benzyl chloride to form S-benzyl-N,N-dibutylthiouronium chloride. This is reacted with sodium 2-cyclohexyl-4,6-dinitrophenate. The S-benzyldibutylthiouronium 2-cyclohexyldinitrophenate thus prepared gives a 100% kill of red spiders when a 1:400 spray is used with a 99% kill at 1:800 and at 1:1600. A wettable powder applied at a dilution giving one pound of this compound per 100 gallons of water gives a 98% kill of red spider. Against army worm this compound gives a 73% kill when applied in a spray at 1:800. On bean plants this compound exhibits slight toxicity. In standard fungitoxicity tests this compound at 0.005% inhibits completely germination of spores of *Sclerotinia fructicola* and at 0.1% spores of *Macrosporium sarcinaeforme*.

In place of the N-butyl groups there may be used other alkyl groups, particularly those of not over four carbon atoms each. These compounds all have marked pesticidal action without development of troublesome phytotoxicity.

*Example 7*

In the same way N,N'-ethylenethiourea is reacted with 3,4-dichlorobenzyl chloride to form N,N'-ethylenethiouronium chloride, which is in turn reacted with sodium 2-capryl-4,6-dinitrophenate to give S-3,4-dichlorobenzyl-N,N'-ethylenethiouronium 2-capryl-4,6-dinitrophenate.

This compound in a spray gives kills of aphids as follows: at 1:400, 92%; at 1:800, 87%; at 1:1600, 92%; and at 1:3200, 83%. At 1:400 it gives a kill of 82% against milkweed bug. At eight pounds per 100 gallons it gives a kill of 100% against army worm. While this compound shows some evidence of being phytotoxic to beans, it is not phytotoxic to young tomato plants.

We claim:

1. As chemical substances, compounds of the structure

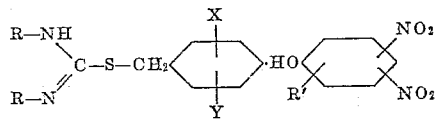

wherein the R groups represent individually a member of the class consisting of hydrogen and alkyl of not over four carbon atoms and represent when taken together an N,N'-ethylene group, R' represents a member of the class consisting of alkyl groups of not over eight carbon atoms, the cyclohexyl group, and chlorine, X and Y represent members of the class consisting of hydrogen and chlorine.

2. As a chemical compound, S-benzylthiouronium 4,6-dinitro-o-cresolate.

3. As a chemical compound, S-chlorobenzylthiouronium 2,4-dinitro-o-cresolate.

4. As a chemical compound, S-benzylthiouronium 2-capryl-4,6-dinitrophenate.

5. As a chemical compound, S-(3,4-dichlorobenzyl)thiouronium 2 - capryl - 4,6 - dinitrophenate.

6. As a chemical compound, S-(3,4-dichloro)-benzyl-N,N'-ethylenethiouronium 2-capryl-4,6-dinitrophenate.

No references cited.